US006486750B1

United States Patent
Disch

(10) Patent No.: US 6,486,750 B1
(45) Date of Patent: Nov. 26, 2002

(54) ELECTRICAL SIGNAL PHASE COMPENSATOR

(76) Inventor: Michael R. Disch, 8301A Lapham Ave., West Allis, WI (US) 53214

( * ) Notice: Subject to any disclaimer, the term of this patent is extended or adjusted under 35 U.S.C. 154(b) by 0 days.

(21) Appl. No.: 09/457,980

(22) Filed: Dec. 9, 1999

Related U.S. Application Data

(63) Continuation-in-part of application No. 08/910,955, filed on Aug. 8, 1997, now Pat. No. 6,137,378.

(51) Int. Cl.[7] .............................. H01P 1/18; H03H 7/18
(52) U.S. Cl. ........................ 333/156; 333/161; 381/97
(58) Field of Search ................................ 333/156, 161, 333/162; 381/97; 174/115, 34

(56) References Cited

U.S. PATENT DOCUMENTS

| 4,538,023 A | 8/1985 | Brisson ...................... 174/115 |
| 4,777,324 A | 10/1988 | Lee ............................... 174/32 |
| 4,945,189 A | 7/1990 | Palmer ........................ 174/32 |
| 5,123,052 A | 6/1992 | Brisson ........................ 381/77 |
| 5,142,252 A | 8/1992 | Brisson ........................ 333/4 |
| 5,230,022 A | 7/1993 | Sakata ......................... 381/98 |
| 5,576,671 A | 11/1996 | Agar, Jr. et al. ............ 333/128 |
| 5,801,601 A | 9/1998 | Gayle .......................... 333/156 |

*Primary Examiner*—Benny Lee
*Assistant Examiner*—Kimberly E Glenn
(74) *Attorney, Agent, or Firm*—Andrus, Sceales, Starke & Sawall LLP

(57) ABSTRACT

An electrical signal phase compensator includes at least two conductors and a ground wire. In a two conductor system, the length of the first conductor is substantially longer than the second conductor. The first conductor and the second conductor are connected in parallel, with the high frequency current in the first conductor and the low frequency current in the second conductor. In a three conductor system, the length of the second conductor is substantially longer than the third conductor which conducts an intermediate frequency. The second conductor is longer than the first conductor. The first conductor, the second conductor, and the third conductor are connected in parallel. The several conductors are mounted to minimize electromagnetic interaction. The electrical signal phase compensator may include a neutral line which is disposed adjacent to the corresponding signal line. Each respective neutral line is connected in parallel. Each end of the plurality of neutral lines is terminated with a potentiometer. Each potentiometer is connected to ground. The electrical signal phase compensator may also be implemented on a circuit board with spaced traces of different lengths. The high frequency conductor in all embodiments has a length which is at least 10 times or more the length of the low frequency conductor and preferably substantially longer to create the most significant compensation.

20 Claims, 3 Drawing Sheets

ELECTRICAL SIGNAL PHASE COMPENSATOR

CROSS REFERENCE TO RELATED APPLICATIONS

This is a continuation-in-part application of U.S. application Ser. No. 08/910,955 filed Aug. 8, 1997 now U.S. Pat. No. 6,137,378, entitled Electrical Signal Phase Compensator.

FIELD OF THE INVENTION

The present invention relates generally to electrical phase compensators and more specifically to an electrical signal phase compensator that is less complicated and more effective than that of the prior art.

DISCUSSION OF THE PRIOR ART

A problem with the transmission of electrical signals is the medium through which they are transmitted. A higher frequency signal will travel faster down a conductor than a lower frequency signal. For example, this phenomenon reduces the quality of audio signals by inducing a phase difference between the high and low frequency signals as they travel on the conductor. This problem can be helped by having a conductor which has varying diameters of wire. The higher frequencies flow down the smaller wires and the lower frequencies flow down the larger diameter wires, due to skin effect.

There have been at least three attempts in the prior art to correct the phase difference between high and low frequencies in a transmission medium. The first is Brisson, U.S. Pat. No. 4,538,023; an audio cable comprises an inner conductor and an outer conductor which consists of numerous wires which are twisted around the inner conductor to compensate for the phase difference between high and low frequencies. The second is Brisson, U.S. Pat. No. 5,123,052; a discrete capacitor is used in conjunction with a transmission line to compensate for the phase difference between high and low frequencies. The second is Sakata, U.S. Pat. No. 5,230,022. An active circuit is used to compensate for the phase difference between high and low frequencies.

The prior art has also provided compensation systems based on use of helically wound low frequency conductors and high frequency conductors connected in parallel. U.S. Pat. No. 4,945,189 which issued Jul. 31, 1990 to Palmer and U.S. Pat. No. 4,777,324 which issued Oct. 11, 1988 to Lee both disclose helically wound twisted conductors and closely spaced conductors for improving the output signal with respect to random noise with interaction of the magnetic fields. The system requires the twisted wires in close spaced relation to produce an improved output. Systems which require the helical wound or twisted conductors do not create a system in which the length of the hf conductor will be greater than the lf conductor by even a factor of five and often much less.

None of the above prior art patents disclose an electrical signal phase compensator which overcompensates or anticipates the delays of high and midrange frequencies which will occur when the signal passes through subsequent electrical circuits.

Accordingly, there is a clearly felt need in the art for an electrical signal phase compensator which does not use an active circuit, a capacitor, or an inductor to correct phase differences between high and low frequencies. There is also a further need for an electrical signal phase compensator which overcompensates or anticipates the delays of high and midrange frequencies which have been encountered and also for those which will be encountered in subsequent circuitry. The high and midrange frequencies are overcompensated such that all frequencies are in-phase at the output of the subsequent circuitry.

SUMMARY OF THE INVENTION

The primary objective of the present invention is to provide a electrical signal phase compensator which does not use an active circuit, a capacitor, or an inductor to correct phase differences between high and low frequencies. There is also a further need for an electrical signal phase compensator which overcompensates or anticipates for delays of high and midrange frequency signals which have been encountered and also for those which will be encountered in subsequent circuitry.

According to the present invention, an electrical signal phase compensator includes at least two conductors and a ground wire. In a two conductor system, the length of the first conductor is substantially longer than the second conductor. The length of the ground wire is not important. The first conductor and the second conductor are connected in parallel. Each conductor and ground wire is insulated.

In a three conductor system, the length of the second conductor is substantially longer than the third conductor. The first conductor is substantially longer than the second conductor. The length of the ground wire is not important. The first conductor, the second conductor, and the third conductor are connected in parallel. It is also possible for the electrical signal phase compensator to have four or more wires. Each diameter of wire is chosen to accommodate a particular frequency range. Each conductor and ground wire is insulated.

In a second preferred embodiment, the electrical signal phase compensator includes a neutral line which is disposed adjacent to the corresponding signal line. Each respective neutral line is connected in parallel. Each end of the plurality of neutral lines is terminated in various ways with potentiometers or resistors. Each potentiometer or resistor is connected to ground. Adjustment of the potentiometer with an audio signal will cause a shift of the amplitude of the audio signal to be increased or decreased.

The electrical signal phase compensator is preferably implemented by using insulated wire that is wrapped around a spool or printed as traces on a circuit board. The conductors may also be wrapped around each other. The different conductors are preferably wrapped on a spool in a radial fashion or adjacent to each other. Each conductor is wound as a coil unit, with the coil unit stacked on each or adjacent each other, and may even be separate coil units. The different conductors may be replicated on a circuit board by nesting different length traces within each other or using multiple layers. The conductors are wrapped in such a way that no inductance is generated in the conductor. The conductors are also spaced to minimize different electromagnetic interaction between the conductors.

The present inventor has found that the several conductors for the different frequencies are not necessarily located to interact directly, and are preferably separate for purposes of construction and application. In the present invention, the several different frequency conductors are separately mounted, either adjacent each other or as completely separate elements formed of wire of an appropriate length, wherein the high frequency length is significantly longer and preferably very substantially longer than the low and/or midfrequency conductor, as presently discussed. This concept permits the complete separate assembly of the different conductors with the proper parallel connection of each subassembly. The present invention is particularly adapted to wrapping each conductor as a separate coil unit on one or more supports such as well known spools. The coil units can be completely separate or can be wound as separate layers on a common spool. The final can be conventionally contained within an outer housing and potted to produce a final compensator for connection into the load system.

The inventor has discovered that the high frequency component of the complex multifrequency signals is a dominant factor in the final output signal and particularly in producing an optimum waveshape based on the original signal. Thus, the high frequency signal skew or offset relative to the initially created signal is very substantial at the input to and the output of the load device or system.

In accordance with a preferred and unique application of the present invention, the high frequency line of the transmission cable is constructed to produce a corresponding offset and cancellation of the skew in the hf component in the output signal at the output device. This effect on the output signal is most practically established by the high frequency hf line being greater in length than the low frequency line by a substantial factor of at least ten (10) and preferably in excess of fifteen (15) or substantially greater. This result is most readily produced with a line having a thin insulation and relatively small diameter wire. The inventor has found that as in the other applications, the diameter of the hf line also contributes to skew modification, and in various applications a combination of length and diameter may be found to produce a most satisfactory result. However, the inventor has found that generally, the line length is most significant.

In a high fidelity sound system, the inventor has constructed a skew compensator having a three line unit with a hf line having a length greater than the lf line by a factor of 20 and by a factor of over 200. In both units the mf line had a factor of 4 and 5 relative to the lf line. In the preferred construction, the high frequency wire is at least a 30 or higher gauge wire. The diameter of the lines were also different, and generally increased with the hf line having a gauge of about 1½ to 2 times the low frequency (lf) line. The quality of the output sound established by both were outstanding relative to the prior systems with smaller difference factors in the lines. The unit having difference factor or the order of 250 produced an audio output quality factor which was considered to be substantially greater than the unit with the difference factor on the order of 20.

The above example of the very substantial hf line lengths are relevant for the teaching of a separate coil or coil units for each frequency band in the construction of the compensator. This is particularly important in making a most effective compensator at a reasonable cost.

The present invention is applicable to various applications which include a broadband input signal including audio signals, visual signals, power signals and others where the broadband signal is transmitted over any significant distance resulting in skewing of the higher frequency component relative to the lower and medium frequency component. The compensator is connected adjacent the receiving element and serves to reset the skewed higher frequency signal component into the original generated alignment. The use of a rather higher compensation of the high frequency component which creates an over compensation of the signal has created an exceptional recreation of the original signal in the receiver by compensating for internal difference in the signal transmission.

The inventor has discovered that although the varying diameter of the wire does contribute to the final improvement in the received signal, it appears that a difference in the diameter of the wire alone will not create a very large change when compared to the change based on significant differing length of the conductor.

Although generally formed with wire of distinct differing lengths and diameters, the diameter could of course continuously vary in an appropriate manner in such a construction. Further, the construction may include a plurality of conductors for each frequency band.

In summary, the inventor has discovered that the high frequency signal line should be wound to preferably create a significant over compensation in the high frequency component of the transmitted signal and thereby insure a proper and improved orientation at the sound, video or power signal receiver.

One advantage of the electrical signal phase compensator is synchronization of electromagnetic fields which result from the propagation of signals down a conductor. The higher frequency signals will travel down the smaller diameter conductor because it provides a decreased impedance path. The higher frequency signals will also arrive at the end of their conductor faster than a lower frequency signal. The increased conductor lengths for higher frequency signals compensate for the faster propagation speed of the higher frequency signals; thus facilitating the synchronization of the electromagnetic fields and preventing any deleterious effect that occurs from electromagnetic fields which are not synchronized. Conductor lengths and diameters are optimized according to the frequencies, currents, and effects desired. The electrical signal phase compensator will work with the same size wires, but performance will be decreased.

The electrical signal phase compensator will work for all frequencies, currents, and voltages. Currents from low frequency DC pluses for controlling motors to higher frequencies for audio and video applications and microprocessors which will benefit from this invention. The electrical signal phase compensator will work anywhere the design of electromagnetic properties are critical to the operation, such as microprocessors, disk drives, or tape devices. Microprocessors with limited real estate, will benefit from improved signal flow. Hard disk drive and tape devices have shown improvement in performance utilizing the present invention.

Accordingly, it is an object of the present invention to provide an electrical signal phase compensator which improves the sonic qualities of audio and other broadband signals by eliminating the phase differences between different frequencies.

It is a further object of the present invention to provide an electrical signal phase compensator which improves the clarity of phone conversations by eliminating the phase differences between different frequencies.

It is yet a further object of the present invention to provide an electrical signal phase compensator which allows the transmission of higher speed modem communications.

It is yet a further object of the present invention to provide an electrical signal phase compensator which improves the performance of motor controllers.

It is yet a further object of the present invention to provide an electrical signal phase compensator which overcompensates high and midrange frequencies such that all frequencies will be in-phase at the output of the subsequent circuitry.

Finally it is another object of the present invention to provide an electrical signal phase compensator which improves the sharpness of a video display.

These and additional objects, advantages, features and benefits of the present invention will become apparent from the following specification.

DETAILED DESCRIPTION OF THE PREFERRED EMBODIMENTS

Figure 1:
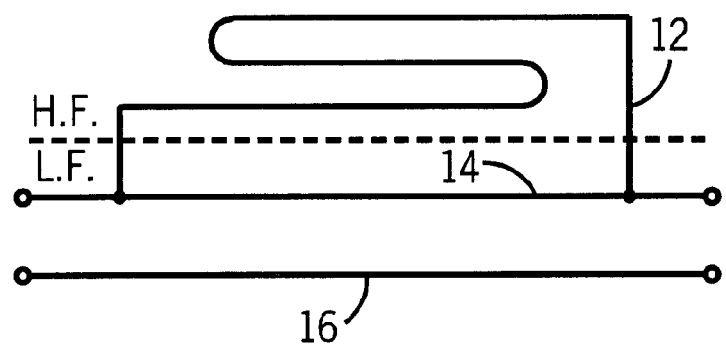
FIG. 1 is a schematic diagram of a two conductor electrical signal phase compensator in accordance with the present invention.

With reference now to the drawings, and particularly to FIG. 1, there is shown a two conductor electrical signal phase compensator 1. The two conductor electrical signal phase compensator 1 includes a first conductor 12, a second conductor 14, and a ground wire 16. It is preferable to decrease the diameter of conductors for higher frequencies to further improve signal quality and optimize skin effect.

Preferred values are given as an example, and not by way of limitation. It has been found that satisfactory performance is achieved for audio signals when the first conductor 12 has a gauge of between 24–30, and the second conductor 14 has a gauge of between 14–20. The length of the second conductor 14 is at least two feet. The first conductor 12 is at least ten feet The ground wire 16 may be any length that is convenient relative to the length of the second conductor 14. The gauge of the ground wire 16 should be equal to the gauge of the largest gauge conductor. The first conductor 12 and the second conductor 14 are connected in parallel. Each conductor and ground wire is insulated.

Figure 2:
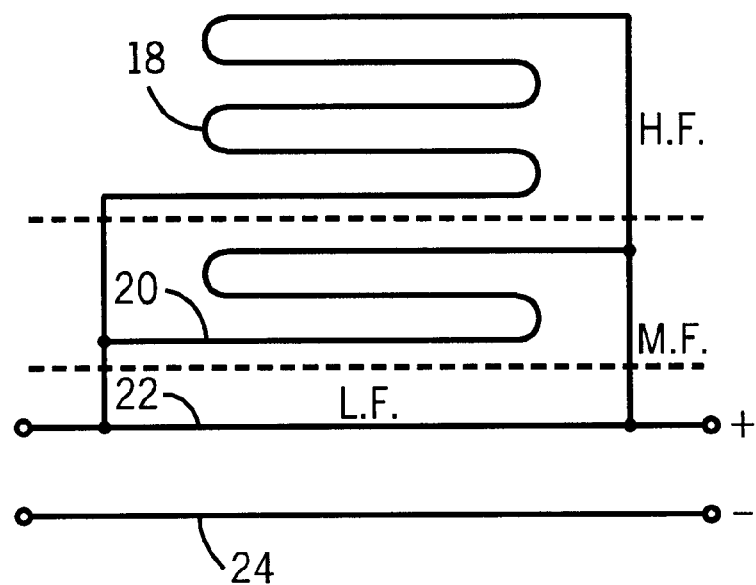
FIG. 2 is a schematic diagram of a three conductor electrical signal phase compensator in accordance with the present invention.

FIG. 2 shows a three conductor electrical signal phase compensator 2. The three conductor electrical signal phase compensator 2 includes a first conductor 18, a second conductor 20, a third conductor 22, and a ground wire 24. It is preferable to decrease the diameter of conductors for higher frequencies to further improve signal quality and optimize skin effect. Preferred values are given as an example, and not by way of limitation. It has been found that satisfactory performance is achieved for audio signals when the first conductor 18 has a gauge of between 24–30, the second conductor 20 has a gauge of between 18–22, and the third conductor 22 has a gauge of between 14–20. The length of the third conductor 22 is at least two feet. The second conductor is at least ten feet. The first conductor 18 is at least twenty-feet. The ground wire 24 may be any length that is convenient relative to the length of the third conductor 22. The gauge of the ground wire 24 should be equal to the gauge of the largest gauge conductor. The first conductor 18, the second conductor 20, and the third conductor 22 are connected in parallel. In audio electronics, the low frequencies will travel on the third conductor 22, the midrange frequencies will travel on the second conductor 20, and the high frequencies will travel on the first conductor 18. Each conductor and ground wire is insulated.

The preferred lengths of the conductors in both the two and three wire configurations are chosen to provide a slight overcompensation to the high and midrange frequencies. The low frequencies will arrive at the end of the three conductor signal phase compensator 2 faster than the midrange frequencies. The midrange frequencies will arrive at the end of the three conductor electrical signal phase compensator 2 faster than the higher frequencies. This choice of phase overcompensation or speeding up of the high and midrange frequencies will compensate for phase delay which will occur when the midrange and higher frequencies go through subsequent circuitry. The length of the conductors in the electrical signal phase compensator can also be designed to make all frequencies arrive at the same time.

Figure 3:
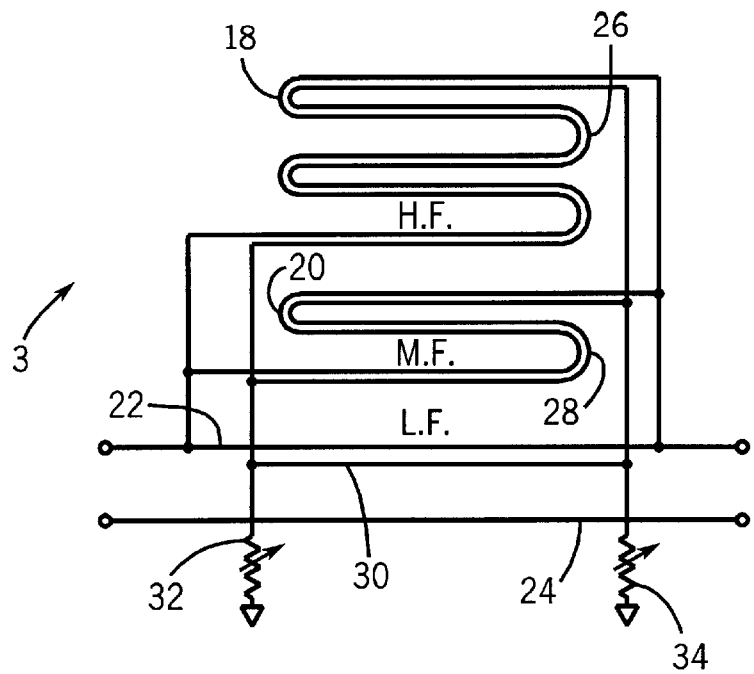
FIG. 3 is a schematic diagram of an electrical signal phase compensator with a neutral wire for each conductor in accordance with the present invention.

FIG. 3 is a schematic diagram of an electrical signal phase compensator 3 with a neutral wire for each conductor. The electrical signal phase compensator 3 includes a first conductor 8 18, a second conductor 20, a third conductor 22, a first neutral wire 26, a second neutral wire 28, a third neutral wire 30, and a ground wire 24. The first neutral wire 26 is disposed adjacent to the fires conductor 18; the second neutral wire 28 is disposed adjacent to the second conductor 20; and the third neutral wire 30 is disposed adjacent to the third conductor 22.

The first neutral wire 26, second neutral wire 28, and the third neutral wire 30 may be connected in parallel. One end of the plurality of neutral wires is terminated with a first potentiometer 32 and the other end is terminated with a second potentiometer 34. The first potentiometer 32 and the second potentiometer 34 are connected to ground. Adjustment of the potentiometers with an audio signal will cause the amplitude of the audio signal to be increased or decreased. If this application is used, the neutral wires are connected in parallel through each potentiometer.

Figure 4:
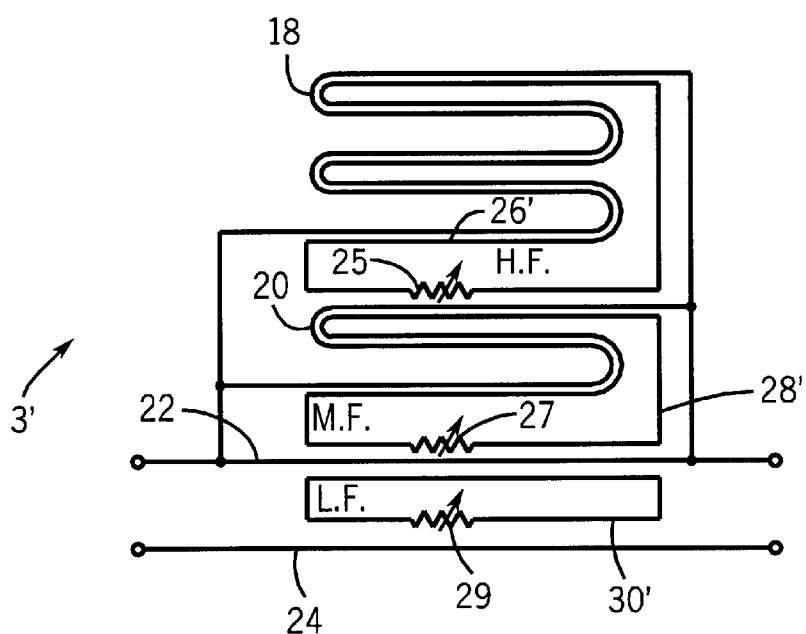
FIG. 4 is a cross sectional view of a spool with different wires wrapped around radially in accordance with the present invention.

FIG. 4 shows an alternative way of connecting potentiometers to the neutral wires. The first potentiometer 25 is connected in series with the first neutral wire 26. The second potentiometer 27 is connected in series with the second neutral wire 28. The third potentiometer 29 is connected in series with the third neutral wire 30. Adjustment of the potentiometers with an audio signal will cause the amplitude of the audio signal to be increased or decreased.

Preferred dimensions for the conductors and the ground wire are the same as those found in the three wire electrical signal phase compensator 2. The lengths of the neutral wires correspond to the lengths of the conductors.

The conductors and neutral wires maybe stored by wrapping thereof around a spool in radial relation to each other. The third conductor 22 is wrapped around the spool first, then the third neutral wire 30 is wrapped around the third conductor 22. Next, the second conductor 20 is wrapped around the third neutral wire 30 and the second neutral wire 28 is wrapped around the second conductor 20. Finally, the first conductor 18 is wrapped around the second neutral wire 28 and the first neutral wire 26 is wrapped around the first conductor 18. The wrapping direction of each conductor and neutral wire on the spool is changed at least once to prevent the generation of any inductance therein. The conductor or neutral wire would be wrapped clockwise for a while then wrapped counterclockwise to cancel inductive effect.

The conductors and neutral wires may also be stored by wrapping thereof around a spool adjacent to each other. The third conductor 22 is wrapped around the spool first, then the third neutral wire 30 is wrapped adjacent to the third conductor 22. Next, the second conductor 20 is wrapped adjacent to the third neutral wire 30 and the second neutral wire 28 is wrapped adjacent to the second conductor 20. Finally, the first conductor 18 is wrapped adjacent to the second neutral wire 28 and the first neutral wire 26 is wrapped adjacent to the first conductor 18. The same order of wrapping would occur if no neutral wires were included.

The electrical signal phase compensator may also be stored by wrapping conductors around each other. The length of the second conductor 20 is wrapped around the length of the third conductor 22. Then the length of the wrapped second conductor 20 and the third conductor 22 are wrapped around the length of the first conductor 18 is wrapped around the second conductor 20. The three conductors with a ground wire may be encapsulated with a rubber exterior and then coiled in a box or the like. With a two conductor electrical signal phase compensator, the length of the first conductor 12 would be wrapped around the length of the second conductor 14.

A two or three conductor electrical signal phase compensator may be implemented using traces on a circuit board. The different conductors may be replicated on the circuit board by nesting different length traces within each other or in multiple layers. It is preferable to use different widths of traces for different frequency ranges to further improve the signal quality. The width of traces will correspond to the wire diameters previously given for the two and three conductor electrical signal phase compensators. The length of a third signal trace is two feet. A second signal trace is at least two and one half times longer than the third signal trace. A first signal trace is at least two and one half times longer than the second conductor. The ground trace may be any length that is convenient relative to the length of the third signal trace. The width of the ground trace should be equal to the width of the largest signal trace. The first signal trace wire, the second signal trace, and the third signal trace are connected in parallel.

Figure 5:
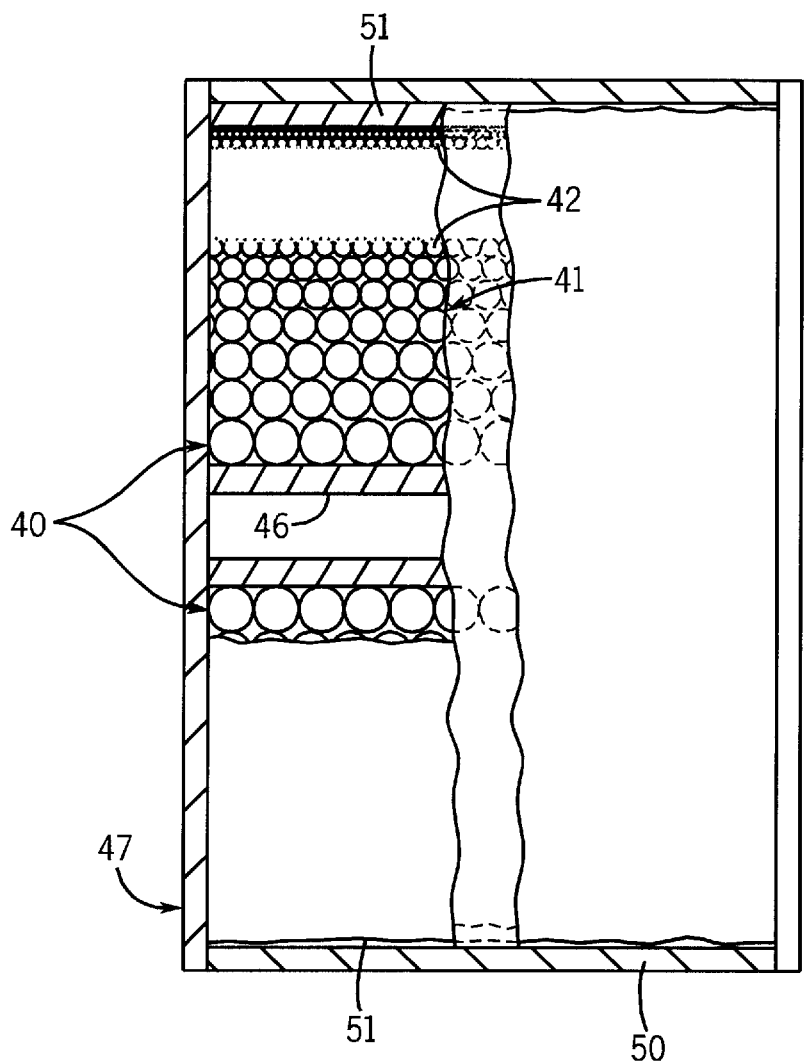
FIG. 5 is an elevational diagrammatic view of a spool wound compensator constructed in accordance with a preferred embodiment of the present invention with parts broken away and sectioned to show detail thereof.
Figure 5A:
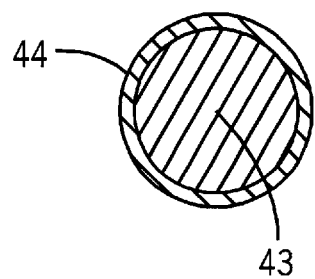
FIG. 5a is an enlarged view of a conductor shown in FIG. 5.

Referring to FIG. 5, a typical example of the improved compensator is illustrated in a spool form. The wires of the three coil units 40, 41 and 42 for the respective low, medium and high frequencies are shown of different diameters. Each of the coil wires is preferably as shown in FIG. 5a, and includes a solid copper wire 43 with an enamel insulation 44.

As shown in FIG. 5, the three coil units 40, 41 and 42 for the low, medium an high frequencies are separate units with the ends of the coil units connected to each other to form three parallel but separate coil units.

The larger diameter low frequency (lf) wire of coil 40 is shown wound on the central core 46 of the spool 47, with a plurality of turns, half which are wound in one direction and half in the opposite direction to avoid any inductive affect. The number of each direction. The medium frequency (mf) wire of coil unit 41 is shown wound on the lf turns and were 300 turns, with 150 turns in each direction. Finally, the high frequency wire of coil unit 42 is wound on the mf turns with 20,000 turns, with 10,000 turns in each direction. The hf length is greater than the lf length by a factor of 250. In the above example, at lf solid copper wire was 22 gauge, the mf solid wire was 33 gauge and the hf solid wire was 40 gauge.

This latter unit was compared to a similar unit having a lf wire of 18 gauge and 50 turns, a mf wire of 26 gauge and 100 turns and a hf wire of 30 gauge and 1,000 turns, or a factor 20.

The first described and larger unit of the two produced an audio output which was very significantly improved compared to the smaller unit. Both however produced a very great improvement over the prior examples in which the maximum length factor between the lf and hf conductors had a factor of 10 between the hf wire and the low frequency wire.

Although shown with the three coils wound one on the other, the coils may be wound next to each on a center coil support or spool, or other wire mounted on separate units with the end turns connected in parallel.

The coil assembly as shown in FIG. 5 is preferably mounted within an outer container 50 which is filled with an appropriate potting material 51. This creates a highly cost effective and long life compensator which is readily mounted and connected into driven system involving broadband power, particularly when the system is designed with the very substantially greater length of the hf signal conductor.

In commercial constructions, the smaller units for audio applications were constructed as compact units.

Generally, the inventor has found units which have a factor of 15 or greater produce an improvement in the output sound of an audio system very substantial over the first systems described in the original specification, and the improvement increase with greater factors. For example, whereas the original unit produces an improvement on the order of 2 to 4% percentile, the units with the very substantial increase in the length of the hf line has been at least 10 to 15% percentile and with the largest disclosed above unit the improvement was on the order of 30 to 50% percentile. The above analysis is based on the results reported by purchasers of the structure made in accordance with the present invention, and the inventor's work in the field of sound compensation over a period of 15 years.

The wire is shown in the preferred round form but a square shaped wire or other suitable wire may also be used in accordance with the present invention.

Although disclosed in a particularly practical embodiment with a spool base, the structure may also readily include a printed, or otherwise formed, circuit board with the respective lf, mf and hf lines formed on the board in separate areas to avoid undesired electromagnetic field interaction. Further, the system may be constructed as a two wire compensator including a relatively low to medium frequency line and the high frequency line of a length on the order of 20 to any higher practical factor relative to the lower frequency line.

The input signal to electric motors for CNC systems is often a broad based band signal with various frequencies. The AC electrical power applied to the motor will not have an ideal waveshape corresponding to the described magnetic field for motor operations, because of the differences in the travel speed of the different frequencies in the supply. The present invention with over compensation more clearly match the electrical waveform to create a more efficient input and prevents or limits overheating of the motor.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A multiple conductor electrical current phase compensator for carrying a broadband current from a source to an output device, comprising at least a first insulated conductor, said first insulated conductor being wound as a first coil with a plurality of superimposed abutting coil layers, each said layers of said first coil having first coil turns wound in a first direction and second coil turns wound in the opposite direction within each layer, a second insulated conductor connected in parallel with said first insulated conductor of said first coil and configured to be connected between said source and said output device, said second insulated conductor being wound as a second coil abutting said first coil and with a plurality of superimposed coil layers, each of said layers of said second coil having first coil turns wound in a first direction and second coil turns wound in the opposite direction within each of said coil layers of said second coil, said first insulated conductor having a first length for conducting said current and configured to carry relatively low frequencies of said current and said second insulated conductor having a second length greater than said first length by a factor of at least ten and configured to carry the higher frequencies of said current, said current at said output device being phase compensated to reflect the phase relationship of the relative low frequencies and high frequencies content at said source, and said first and second coils thereby wound to control the inductance of the coils and thereby minimize interaction between the first and second coils.

2. The phase compensator of claim 1 including a third insulated conductor wound as a third coil abutting said second coil and with a plurality of superimposed coil layers of said third coil having first turns wound in a first direction and second coil turns wound in the opposite direction and being connected in parallel with said first and second coils, said third insulated conductor configured to carry a medium frequency of current.

3. The phase compensator of claim 2 wherein said insulated conductors are each a solid copper wire.

4. The phase compensator of claim 3 including a relatively thin enamel insulator.

5. The phase compensator of claim 1 wherein said second length is greater than said first length by a factor of at least fifteen.

6. The phase compensator of claim 1 wherein said second length is greater than said first length by a factor of at least one hundred.

7. The phase compensator of claim 1 wherein said first insulated conductor has a higher gauge than said second insulated conductor.

8. The phase compensator of claim 2 wherein said second length is greater than the first length by a factor of at least one hundred.

9. The phase compensator of claim 2 wherein said first insulated conductor has a gauge less than the gauge of said second insulator conductor and said third conductor has a gauge between said first and second conductors.

10. The phase compensator of claim 1 wherein said first and second insulated conductors are each a solid copper wire conductor.

11. The phase compensator of claim 10 wherein each conductor has an enamel insulation.

12. A multiple conductor phase compensator for a broadband current source configured to be connected to a load, comprising a first conductor wound on itself to form a first multilayer coil of wire configured to conduct a low frequency current, a second multilayer conductor wound on itself to form a second coil of wire configured to conduct a middle frequency current, and a third multilayer conductor wound on itself to form a third coil of wire configured to conduct a high frequency current, the length of wire in said third coil being substantially longer than the wire in said first and second coil by a factor of at least ten, each of said coils is wound as a multiple layer coil with at least a first layer having first coil turn in one direction and second coil turn wound in the opposite direction and a second layer with as having first coil turn in any direction and second coil turn wound in the opposite direction and said multilayer coils wound to control the inductance of the coils.

13. The phase compensator of claim 12 wherein each of said coils is wound of a wire including a solid copper wire having an enamel insulation.

14. The phase compensator of claim 12 wherein said coils are wound on a common spool, having end walls joined by a common center support.

15. The phase compensator of claim 14 wherein said first coil is wound on said center support, said second coil is wound on said first coil and said third coil is wound on said second coil.

16. The phase compensator of claim 14 wherein said wound spool is encapsulated in a potting compound.

17. The phase compensator of claim 12 wherein said wire has a gauge for audio equipment.

18. The phase compensator of claim 12 wherein said wire has a gauge for power equipment.

19. The phase compensator of claim 12 wherein each of said coils is wound with substantially one half of the coil turns in a first direction and the other half in the opposite direction.

20. The phase compensator of claim 19 wherein the coils are wound with the first direction turns are completed as adjacent turns and the second direction turns are formed as immediately adjacent turns.

* * * * *